(12) United States Patent
Simor et al.

(10) Patent No.: US 11,420,227 B2
(45) Date of Patent: Aug. 23, 2022

(54) METHOD FOR TREATING AN ELONGATED OBJECT, APPARATUS AND METHOD

(71) Applicant: DSM IP ASSETS B.V., Heerlen (NL)

(72) Inventors: Marcel Simor, Rijswijk (NL); Ales Fiala, Rotterdam (NL); Harm van der Werff, Echt (NL)

(73) Assignee: DSM IP ASSETS B.V., Heerlen (NL)

(*) Notice: Subject to any disclaimer, the term of this patent is extended or adjusted under 35 U.S.C. 154(b) by 629 days.

(21) Appl. No.: 15/937,443

(22) Filed: Mar. 27, 2018

(65) Prior Publication Data

US 2018/0221915 A1    Aug. 9, 2018

Related U.S. Application Data

(63) Continuation of application No. 14/810,149, filed on Jul. 27, 2015, now Pat. No. 9,956,585, which is a (Continued)

(30) Foreign Application Priority Data

Jan. 10, 2007   (EP) .................................... 07075023

(51) Int. Cl.
  *B05D 1/00*    (2006.01)
  *B29C 59/14*   (2006.01)
  (Continued)

(52) U.S. Cl.
  CPC .............. *B05D 1/62* (2013.01); *B29C 59/142* (2013.01); *C08J 7/18* (2013.01); *D06M 14/18* (2013.01);
  (Continued)

(58) Field of Classification Search
  None
  See application file for complete search history.

(56) References Cited

U.S. PATENT DOCUMENTS 3,442,633 A   5/1969  Merton
3,632,299 A   1/1972  El Cerrito
              (Continued)

FOREIGN PATENT DOCUMENTS

EP   1741826   1/2007
EP   1910611   4/2008
         (Continued)

OTHER PUBLICATIONS

Cernak, et al. (2004) Contrib. Plasma Phys 44:492-495 "Generation of Thin Surface Plasma Layers for Atmospheric-Pressure Surface Treatments".

(Continued)

*Primary Examiner* — Shamim Ahmed
*Assistant Examiner* — Bradford M Gates
(74) *Attorney, Agent, or Firm* — Nixon & Vanderhye P.C.

(57) ABSTRACT

The invention relates to a method for treating an elongated object using a plasma process. The method comprises the steps of providing an elongated object in a planar electrode structure, and applying potential differences between electrodes of an electrode structure to generate the plasma process. Further, the method comprises at least partially surrounding the elongated object by a unitary section of the guiding structure, the electrode structure being associated with the unitary section.

17 Claims, 10 Drawing Sheets

Related U.S. Application Data continuation of application No. 12/522,891, filed as application No. PCT/NL2008/050017 on Jan. 10, 2008, now Pat. No. 9,205,595.

(51) Int. Cl.
*C08J 7/18* (2006.01)
*D06M 14/18* (2006.01)
*H05H 1/24* (2006.01)
*D06M 14/26* (2006.01)

(52) U.S. Cl.
CPC .......... *D06M 14/26* (2013.01); *H05H 1/2406* (2013.01); *B29C 2059/145* (2013.01); *H05H 1/2431* (2021.05)

(56) References Cited

U.S. PATENT DOCUMENTS

| | | | |
|---|---|---|---|
| 5,039,549 A * | 8/1991 | Nguyen | C08J 7/18 427/322 |
| 5,585,147 A | 12/1996 | Ogawa | |
| 5,968,377 A | 10/1999 | Yuasa | |
| 6,313,430 B1 | 11/2001 | Fujioka | |
| 9,205,595 B2 | 12/2015 | Simor | |
| 9,956,585 B2 | 5/2018 | Simor | |
| 2004/0092183 A1 * | 5/2004 | Geva | B32B 5/12 442/134 |
| 2004/0097895 A1 * | 5/2004 | Busam | D06M 14/18 604/367 |
| 2004/0194223 A1 | 10/2004 | Cernak | |
| 2016/0082470 A1 | 3/2016 | Simor | |

FOREIGN PATENT DOCUMENTS

| | | |
|---|---|---|
| JP | H 10087857 | 7/1998 |
| JP | 11209487 | 8/1999 |
| WO | WO 2002/023960 | 3/2002 |
| WO | WO 2002/095115 | 11/2002 |
| WO | WO 2005/110626 | 11/2005 |
| WO | WO 2006/135347 | 12/2006 |
| WO | WO 2007/008063 | 1/2007 |

OTHER PUBLICATIONS

Cernakova, et al. (2005) Plasma Chemistry and Plasma Processing 25(4):427-437, "Surface Modification of Polypropylene Non-Woven Fabrics by Atmospheric-Pressure Plasma Activation Followed by Acrylic Acid Grafting".
Database WPI Week 200005, Thomson Scientific, London, GB; AN 2000-056363 XP002499102 & JP 11 209487 A (Nitto Denko Corp) Aug. 3, 1999 Abstract.
Fiala, et al. (2006) Plasma Technology, XP-001521113, pp. 14-16, "Plasma Technology for Multifunctional Textiles".
International Search Report, dated Oct. 10, 2008, from WO 2008/085047.
Notice of Allowance from U.S. Appl. No. 12/522,891 dated Aug. 11, 2015.
Notice of Allowance from U.S. Appl. No. 14/810,149 dated Dec. 29, 2017.
Office Action from EP 0805086.0 dated Jun. 7, 2016.
Office Action from U.S. Appl. No. 12/522,891 dated Nov. 8, 2013.
Office Action from U.S. Appl. No. 12/522,891 dated Mar. 20, 2014.
Office Action from U.S. Appl. No. 12/522,891 dated Oct. 10, 2014.
Office Action from U.S. Appl. No. 12/522,891 dated Mar. 4, 2015.
Office Action from U.S. Appl. No. 14/810,149 dated Jan. 27, 2017.
Office Action from U.S. Appl. No. 14/810,149 dated Nov. 6, 2017.
McKenna et al., "*Handbook of fibre rope technology*", The Textile Institute, pp. 10, 47-48 and 51-54 (2004).

* cited by examiner

METHOD FOR TREATING AN ELONGATED OBJECT, APPARATUS AND METHOD

RELATED APPLICATIONS

This application is a continuation of U.S. application Ser. No. 14/810,149, filed Jul. 27, 2015, entitled "Method for Treating an Elongated Object, Apparatus and Method", now U.S. Pat. No. 9,956,585. U.S. Pat No. 9,956,585 is a continuation of U.S. application Ser. No. 12/522,891, filed Sep. 25, 2009, now U.S. Pat. No. 9,205,595. U.S. Pat. No. 9,205,595 is a 35 U.S.C. § 371 national phase application of PCT/NL2008/050017, filed on Jan. 10, 2008, which application claims the benefit of European Application No. 07075023.7, filed Jan. 10, 2007. Each of the above-referenced applications is incorporated herein by reference in its entirety.

TECHNICAL FIELD

The invention relates to a method for treating an elongated object using a plasma process, comprising the steps of providing an elongated object in a guiding structure, and applying potential differences between electrodes of an electrode structure to generate the plasma process.

BACKGROUND

Many polymeric, such as polypropylene and polyester, materials have many excellent properties, such as low specific weight, high strength and modulus, toughness, fatigue resistance, and good resistance against chemicals. However, such polymeric materials generally possess poor wettability, dying ability, bondability, adhesion to various matrices, etc. Therefore, for many applications, it is required or advantageous to treat the surface of endless elongated objects, such as filaments, before they are e.g. processed into a final product.

In industrial scale, the surface treatment is normally carried out by a wet chemical processing. The wet processing has some inherent disadvantages, such as it may negatively influence bulk properties of the treated material, the process is often environmentally detrimental because it uses a lot of harmful and/or toxic chemicals, it needs and pollutes a lot of water, and it is costly in both processing time and energy because the processing requires heating and drying. In addition, some wet deposition processes are difficult to scale-up due to complicated multi-step processing steps.

New plasma technologies, which are dry and environmentally friendly, have appeared recently. Plasma modification only takes place on the uppermost surface and does not change the bulk properties of the treated material when used appropriately. Although the laboratory-scale feasibility of plasma technologies for the treatment of elongated objects, such as filaments, has been shown, those technologies still have many drawbacks and no commercial plasma equipment for the continuous surface treatment of high volume endless filaments, and elongated objects in general, is available.

In a prior art pulsed surface discharge process (also called aborted arc), an endless fibre is guided through two hollow tubular on-axis-arranged electrodes, and plasma is generated between the electrodes. The generated plasma is rather intense. As the melting temperature of treated polymer fibres is quite low, usually below 200° C., the high intensity of plasma forces the treatment time to be very short, e.g. circa 0.1 second per 1.5 cm distance between the electrodes, in order to prevent the melting of the treated material. Moreover, the gas composition influences a path in which plasma channels develop—the plasma channel can bridge the discharge electrodes either through the gas environment, i.e. not touching the treated fibre, or along the surface of the fibre. For example, in a pure nitrogen atmosphere, plasma channels tend to spread on the surface of fibres but when oxygen is present, plasma channels rather bridge the electrodes through the gas atmosphere without touching, and thus treating, the fibre itself. Both the high intensity of plasma and the sensitivity of discharge to gas composition result in an inhomogeneous surface treatment. Inhomogeneity of the treatment with the aborted arc discharge is further enhanced by the diameter of the treated fibre—the larger diameter of a fibre the larger level of inhomogeneity. That is basically due to the fact that only one plasma channel occurs at one moment, i.e. plasma channels appear sequentially, one after another, and there are not two or more plasma channels present simultaneously.

It is noted that the earlier filed but non-published European patent application having application number 05076567.6 discloses a method for depositing a polymer layer containing nanomaterial on a flat substrate material, such as a textile, paper, foil, membranes, leather and/or ceramics, comprising the steps of providing the substrate material, providing a polymerization material near a surface of the substrate material, conducting a flow near the surface of the substrate material, the flow comprising a nanomaterial, and depositing the polymer layer containing nanomaterial on the surface of the substrate material by applying a plasma polymerization process.

The present invention is directed toward overcoming one or more of the problems discussed above.

SUMMARY OF THE EMBODIMENTS

It is an object of the invention to provide a method for treating an elongated object using a plasma process, wherein the disadvantages identified above are reduced. In particular, the invention aims at obtaining a method for treating an elongated object using a plasma process that is stable and operates at atmospheric pressure. Thereto, the method according to the invention further comprises at least partially surrounding, in a cross sectional view, the elongated object by a unitary section of the guiding structure, the electrode structure being associated with the unitary section, wherein the electrode structure comprises a dielectric body provided with a curved section integrated with the curved unitary section, and at least one electrode arranged at the radial inner side of the dielectric body section or embedded in the dielectric body.

The electrodes associated with the unitary section of the guiding structure allow stable operation at atmospheric pressure, for virtually any gaseous environment and even for high discharge powers. Plasma treatment is at least near the surrounding section homogeneous and plasma also penetrates into the structure of treated elongated objects if allowed by their structure. The treatment occurs not only on the outer surface of elongated objects but also on inner surfaces for example in case that the elongated objects are made of a porous material, and/or on the outer surface of individual fibres from which the elongated object is eventually made. For example, when a yarn is treated according to the invention, plasma treatment occurs on the level of individual fibres that make up the yarn. Further, the electrode structure according to the invention allows plasma activation, plasma induced polymerization, plasma polymerization and plasma-assisted grafting, thereby realizing for example the deposition of polymer coatings and nanocomposites, i.e. polymer coatings with nanomaterial. Those treatments change only surface properties of treated materials without affecting their bulk material characteristics such as the mechanical strength and melting temperature. Plasma treatment according to the invention is also suitable for heat sensitive materials. The concept of the electrode structure according to the invention is such that it is easily scalable and suitable for a multi-stage treatment if several electrode structures are placed one after another. Last but not least, the treatment is dry and environmentally friendly. It does not require water, heating and drying and only a small amount of chemicals is needed compared to traditional wet processing.

Virtually any hose shaped material may be treated by using the electrode structure according to the invention. Examples include polymeric endless fibres, ceramic, glass and any other nonconductive fibres but also hoses and rods.

By applying a plasma process that is activated by an electrode structure, which is associated with an unitary section of the guiding structure that is at least partially surrounding an elongated object to be treated, a more or less evenly distributed plasma process is activated in a cross section substantially transverse with respect to a longitudinal axis of the unitary section. In a cross sectional view, the curved unitary section at least partially surrounds the elongated object to be treated. By providing a curved unitary section that is concave in a cross sectional view of the elongated object, the guiding structure is arranged for suitably receiving the objected to be treated by the plasma process. As a result, an elongated object might be treated substantially more homogeneously in the above-mentioned cross section compared with the situation of a plasma process using flat shaped electrode structures, especially if a diameter of the elongated object to be treated is larger than approximately 1 mm. Further, the plasma process is more efficient than in the situation of a flat shaped electrode structure, as the location of the plasma is where the plasma treatment needs to occur, i.e. in a surrounding segment of the elongated object to be treated, as the elongated object is at least partially surrounded by the guiding structure when viewed in a cross section.

By providing the electrode structure with a dielectric body provided with a curved section that is integrated with the curved unitary section, and at least one electrode arranged at the radial inner side of the dielectric body section or embedded in the dielectric body, in principle any atmosphere can be chosen for the plasma process.

Preferably, the curved unitary section forms a cylinder defining a passage enclosed by the curved section for receiving the elongated object, so that the elongated object can be treated by a plasma generated from in principle all radial directions. In fact, the cylindrically shaped electrode structure generates a plasma substantially enclosing the elongated object in the above-mentioned cross section, thereby improving homogeneous and efficient aspects of the plasma process.

Alternatively, the curved unitary section forms a groove in a substantially flat structure, so that a segment of the elongated object to be treated, e.g. a semi-circle in cross section, is treated substantially homogeneously.

Preferably, the electrode structure is in the cross section transverse with respect to the longitudinal axis of the structure circular to optimize a homogeneous plasma in an azimuthal direction. If the electrode structure is substantially invariant in the longitudinal direction, a tubular shaped electrode structure is obtained. However, also other cross sectional shapes might be applied, such as elliptical or square shapes to comply with the outer surface of elongated objects or to disturb homogeneity of treatment in a controlled and desirable way.

It is noted that the effect of a homogeneous and efficient plasma process in particular applies if the elongated object has an elongated substantially cylindrical structure so that the outside shape of the elongated object substantially in a cross section transverse with respect to the longitudinal axis of the electrode structure coincides with the inner shape of the cylindrically shaped electrode structure. However, also other elongated object shapes can be treated, such as planar elongated objects or rods that are substantially triangular in cross section.

In an advantageous way, the effect of a homogeneous and efficient plasma process optimally applies if the elongated object and the electrode structure have a similar cross sectional shape. As an example, the elongated object comprises a line of fibre that is treated in a tubular shaped electrode structure.

By treating an endless elongated object, a continuous plasma process can advantageously be applied. Alternatively, batch wise plasma processes could be applied to materials having limited dimensions.

By providing a polymerization material near and/or on a surface of the elongated object, conducting a flow near and/or on the elongated object surface, the flow comprising a nanomaterial and depositing the polymer layer containing nanomaterial on the elongated object surface by applying a plasma polymerization process, virtually any type of nanomaterial, also non-metal types of nanomaterial, can be embedded in the polymer layer, e.g. organic material. This is due to the feature that not only metal-type particles, but virtually any nanomaterial can be provided in a flow.

Alternatively, the polymer layer containing nanomaterial can also be deposited otherwise, e.g. by providing a polymerization material on a surface of the elongated object, providing a nanomaterial on a surface of the elongated object simultaneously, before, after or in between providing the surface with polymerization material, before the surface of the elongated object on which both the polymerization material and the nanomaterial have been applied is subjected to the plasma environment.

As a further alternative, the polymer layer containing nanomaterial can also be deposited by providing a polymerization material on a surface of the elongated object, providing a nanomaterial on a surface of the elongated object simultaneously, before, after or in between providing the surface with polymerization material, and after the surface of the elongated object is subjected to the plasma environment.

By attaching nanomaterial or depositing a polymer layer containing nanomaterial on an elongated object, surface features of the material can be significantly changed, e.g. the performance in terms of stain-resistance improves, without affecting bulk properties of the elongated objects.

The method according to the invention offers alternatives to the wet processing of how to deposit polymer layers with and without virtually any nanomaterial, the so-called plasma polymerization, plasma induced polymerization and plasma assisted grafting techniques, on surface of elongated objects. Polymers formed by the plasma polymerization can have different, and for many applications superior, chemical and physical properties compared to polymers formed by a conventional polymerization.

According to the method, virtually any nano- and micro-size material of organic, inorganic and organic-inorganic composition, can be deposited by the technique of plasma polymerization. Nanomaterial is attached to a surface of treated material due to a polymer layer deposited in the process of plasma polymerization on the said surface. The nanomaterial-containing polymer layer derives its functionality from the characteristics of both the nanomaterial and the polymer layer. The strength of invented method is the unique combination of advantages of non-thermal, atmospheric pressure plasma processing and the fact that nanomaterial is delivered from outside (externally) to the reaction space.

The method allows the superior control of the nanomaterial deposit, such as the surface density of nanomaterial, its uniformity and homogeneity. Further, because the nanomaterial is not created in the plasma process but is delivered to the reaction space from outside (externally), the method allows choosing nanomaterial with desired characteristics, such as size and size distribution, allowing thus an excellent control over the characteristics of the deposited nanomaterial.

Enhancement of performance of a treated material could be achieved due to a combined effect of the deposited nanomaterial and properties of the polymer layer itself. Polymers formed by the process of plasma polymerization can have different chemical and physical properties from those formed by conventional polymerization. Plasma polymerized films are, in general, highly cross-linked and, therefore, can have many appealing characteristics such as thermal stability, chemical inertness, mechanical toughness and a negligible effect of ageing.

In the plasma polymerization process, advantageously no liquid baths comprising toxic or harmful chemicals are required in contrast to wet techniques. Further, no heating, drying and/or curing activities are needed, thereby reducing operational costs.

The plasma polymerization process is also known as plasma assisted or plasma enhanced or plasma chemical vapour deposition.

Again, it is noted however, that the method according to the invention is not limited to depositing nanocomposites, but also applies to depositing polymer coatings and more in general to plasma activation. The method according to the invention can be employed for improving hydrophilicity, hydrophobicity, olephobicity, wickability, printability, bondability, dyeability, soil repelency, fire retardancy, fire resistancy, biocompatibility, UV protection, antistatic, antifouling and antimicrobial features of the elongated objects to be treated.

The elongated object to be treated may comprise any natural or synthetic, organic or inorganic material or a combination thereof.

The method according to the invention can be used for improving printability and dyeability features of filaments.

Further, the treated filaments can be used for personal protection products, such as bullet resistant armor, armor plates inserted into garments, clothing for example for police and military personnel, motorcycle suits, crash helmets and gloves, for object protection products such as vehicle or ship protection. In addition, the treated filaments can be used in composite materials and reinforced textiles to be used for example in aerospace and aircraft industries; automotive, marine and railway applications; electronics industry; civil engineering and reinforcement structures such as for example pressure vessels and containers. The treated filament can also be used to make ropes, cables and nets. Other applications for the thus treated filament are medical applications, such as strong orthopedic sutures and other surgical implants. Then, the thus treated filament can be incorporated in fabrics to achieve demanding performance required in a wide range of applications such as yachting sails, protective gloves and aprons, protective sportswear, and various industrial textiles. In another application, the treated filament is incorporated into a rubber matrix for example for tyres, reinforced hoses and belts, and mechanical rubber goods reinforcement. Still another application includes materials for filtration and extraction, fibre optic cables, sport goods and fishing lines.

The plasma process can advantageously be performed under substantially atmospheric pressure, thereby reducing costs for providing low pressure circumstances at the locus of the elongated object to be treated.

In the method according to invention, preferably, the flow comprises a material in which a discharge is generated and/or which also serves as a carrier for carrying a nanomaterial and/or a polymerization material. The flow material comprises a gas or a mixture of gases. However, it is also possible to use other materials, such as a gasified liquid, a liquid, an atomized (sublimated) solid.

The polymerization material can be a gas or other materials, such as a gasified liquid, a liquid, and an atomized (sublimated) solid, and it can comprise any material, such as a monomer, a dimer, a trimer, a copolymer, etcetera, which can create a polymer in plasma. The polymerization material can also be a mixture of different polymerization materials.

It is noted that with the term "polymer layer" also a polymer-like layer has to be understood.

It is noted that the expression 'elongated object' means that a longitudinal length of the object is large with respect to a maximum one-dimensional parameter in a cross section of the object. As an example, the method according to the invention is applicable to filaments, but also to other elongated objects, such as hose shaped objects, tubes, pipes, rods, either solid or hollow. Such objects might be manufactured from polymeric, wood and composite materials.

By the term "nanomaterial" is meant particles and in general any structure with the size in nanometer and micrometer range. Those structures include nanofibres and/or nanotubes or combination of them, such as nanotubes with attached and/or embedded nanoparticles and/or nanoparticles with encapsuled one or more elements, such as drug, dye and/or fragrance. Further, the nanomaterial can comprise either one type of nanomaterial or a mixture of nanomaterials. Preferably, the nanomaterial comprises a metal and/or a metal oxide in order to result in specific enhanced features of the elongated object. Instead of using metals and/or metal oxides, other organic, inorganic nanomaterial or inorganic-organic systems could be used.

By the term "surface" is meant an inner or outer surface of a treated elongated object. The term "surface" also includes inner surfaces of an elongated object having a porous structure. In some embodiments the surface may comprise just one or a multiple number of filaments, which do not form a web but for example a cord, by which is understood a long slender flexible material usually consisting of several strands (as of thread or yarn) woven or twisted together.

The term 'filament' means both a fibre and a yarn. A fibre is a basic entity, either natural or synthetic, which is twisted into yarns for production purposes of a fabric, cord, thread, etc. Yarn is a continuous strand of textile fibres created when a cluster of individual fibres are twisted together.

Fibres from virtually any material can be treated by using a plasma process, for example cellulose and cellulose derived fibres, polyester fibres, aramid fibres, polyethylene (PE) fibres, polypropylene or polypropene (PP) fibres, polyamide fibres, poly/p-phenylene sulphide fibres (PPS), polyimide fibres, aromatic heterocyclic polymer fibres, polybenzimidazole fibres (PBI), polybenzothiazole fibres (PBT) and polybenzoxazole fibres (PBO), polyetheretherketone fibres (PEEK), polyetherimide fibres but also inorganic carbon fibres, ceramic and glass fibres.

The term "coating" includes coatings that completely cover a surface or just a portion of a surface.

By the term "plasma" is meant a partially ionized gas that represents chemically active environment, which consists of activated species such as electrons, ions, radicals, metastables and photons.

Further, by "plasma polymerization" is meant the procedure, in which polymerizable materials, stimulated through a plasma, condense as polymers.

Further, the term 'endless' means that the length is at least a number of lengths of the treatment space where the plasma process is performed, such as the process channel 80 or the length of a surface of a planar electrode structure.

In an embodiment, the polymerization material is mixed with the nanomaterial in the flow. Thereby, providing the polymerization material and nanomaterial near a surface of the elongated object is further simplified. The ratio of polymerization material with respect to nanomaterial can relatively easily be monitored and controlled, while a substantially homogenous deposition layer can be obtained in combination with a good control over the surface density and uniformity of the deposited nanomaterial. Further, the polymerization material can serve as the carrier material for carrying the nanomaterial. Alternatively, the nanomaterial can be brought near the surface of the elongated object before and/or during the plasma process or even after performing individual plasma polymerization procedures.

To provide the flow comprising the nanomaterial, an injection system can be employed for injecting the nanomaterial into the flow. Otherwise, the nanomaterial might be blended in a dispersion of a liquid precursor. Further, the nanomaterial is mixed with a gaseous precursor. Optionally, the flow is conducted over or through dry nanomaterial or its dispersion.

Further, the invention relates to an apparatus for treating an elongated object using a plasma process, comprising a guiding structure for guiding the elongated object, and a electrode structure for generating the plasma process, wherein the guiding structure comprises an elongated object receiving curved unitary section that is arranged for at least partially surrounding the elongated object, and wherein the electrode structure is associated with the unitary section.

The invention also relates to a method for treating an elongated object using a plasma process, comprising the steps of providing an elongated object and a planar electrode structure, and applying potential differences between electrodes of the electrode structure to generate the plasma process, wherein the elongated object is positioned near or on the electrode structure.

Other advantageous embodiments according to the invention are described in the following claims.

Various modifications and additions can be made to the embodiments discussed without departing from the scope of the invention. For example, while the embodiments described above refer to particular features, the scope of this invention also included embodiments having different combination of features and embodiments that do not include all of the above described features.

BRIEF DESCRIPTION OF THE DRAWINGS

A further understanding of the nature and advantages of particular embodiments may be realized by reference to the remaining portions of the specification and the drawings, in which like reference numerals are used to refer to similar components. In some instances, a sub-label is associated with a reference numeral to denote one of multiple similar components. When reference is made to a reference numeral without specification to an existing sub-label, it is intended to refer to all such multiple similar components.

DETAILED DESCRIPTION

While various aspects and features of certain embodiments have been summarized above, the following detailed description illustrates a few embodiments in further detail to enable one of skill in the art to practice such embodiments.

The described examples are provided for illustrative purposes and are not intended to limit the scope of the invention.

In the following description, for the purposes of explanation, numerous specific details are set forth in order to provide a thorough understanding of the described embodiments. It will be apparent to one skilled in the art, however, that other embodiments of the present invention may be practiced without some of these specific details. Several embodiments are described and claimed herein, and while various features are ascribed to different embodiments, it should be appreciated that the features described with respect to one embodiment may be incorporated with other embodiments as well. By the same token, however, no single feature or features of any described or claimed embodiment should be considered essential to every embodiment of the invention, as other embodiments of the invention may omit such features.

Unless otherwise indicated, all numbers used herein to express quantities, dimensions, and so forth used should be understood as being modified in all instances by the term "about." In this application, the use of the singular includes the plural unless specifically stated otherwise, and use of the terms "and" and "or" means "and/or" unless otherwise indicated. Moreover, the use of the term "including," as well as other forms, such as "includes" and "included," should be considered non-exclusive. Also, terms such as "element" or "component" encompass both elements and components comprising one unit and elements and components that comprise more than one unit, unless specifically stated otherwise.

Figure 1:
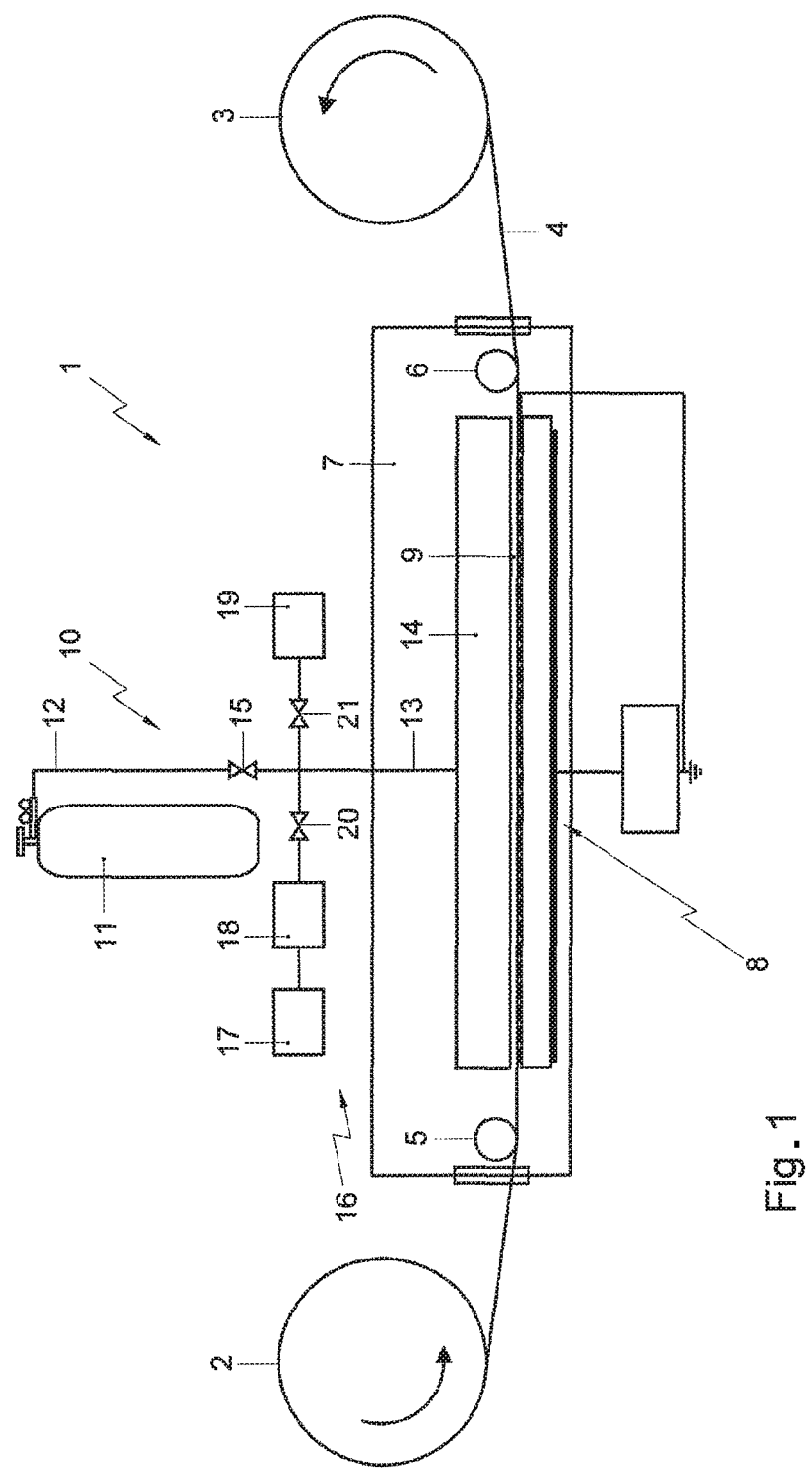
FIG. 1 shows a schematic view of a depositing apparatus.

FIG. 1 shows a schematic view of a first embodiment of an apparatus 1 for plasma treatment of elongated object, preferably plurality of elongated objects, for example, for deposition a polymer layer containing nanomaterial on an array of filaments. The apparatus 1 comprises filaments carriers having a first and a second set of bobbins 2, 3 for winding the array of filaments 4. The array of filaments 4 between the two sets of bobbins 2, 3 is guided by means of a first and a second guiding roller 5, 6 in an atmospheric pressure plasma chamber 7. The configuration of the bobbins 2, 3 and the rollers 5, 6 form a guiding structure for guiding elongated objects to be treated. The plasma is generated by means of an electrode structure 8 having a substantially flat boundary plane 23, which is arranged near a bottom surface 9b of the array of filaments 4 to be treated. The plasma electrode structure 8 will be described in more detail with reference to FIGS. 2-5.

The apparatus 1 further comprises a transport structure 10 for providing a polymerization material near the top surface 9t and/or bottom surface 9b of the array of filaments 4 to be treated, as well as for conducting a flow near the surface 9t of the array of filaments 4, the flow comprising a nanomaterial. The transport structure 10 comprises a carrier gas tank 11, e.g. a gas bottle, a pipe segment 12, a feed line 13 and an outlet port 14. The carrier gas tank 11 is connected with the pipe segment 12 to generate a flow in the feed line 13. The feed line 13 is interconnected with the pipe segment 12 via a connection module or valve 15. The end of the feed line 13 is mounted on the outlet port 14 so that during use the flow streams through an upper opening in the outlet port 14. The outlet port 14 is arranged opposite to the plasma electrode structure 8 so that it faces the top surface 9t of the array of filaments to be treated. As will be explained in more detail with reference to FIGS. 6 and 7, the outlet port 14 is provided with openings to provide the flow near the top surface 9t of the array of filaments 4. As a consequence, the array of filaments 4 to be treated is substantially located between the outlet port 14 and the substantially flat boundary plane 23 of the plasma electrode structure 8.

It is noted that the polymerization material can also be provided by means of a gasified liquid precursor or a sublimated solid precursor, instead of the gaseous precursor according to the shown embodiment.

As indicated, the transport structure 10 is further arranged to conduct a flow comprising nanomaterial towards the top surface 9t of the array of filaments 4 through a valve 20, the feed line 13 and the outlet port 14. The transport structure 10 comprises a vessel 17 with a liquid polymerization material (precursor) connected with a liquid gasifier 18 which is connectable with the feed line 13 by means of the valve 20. Further, the transport structure 10 comprises a vessel 19 with a gaseous polymerization material (precursor) which is connectable with the feed line 13, via a second valve 21. It is noted that the polymerization material can also be provided by means of a sublimated solid precursor, instead of the gaseous precursor or a gasified liquid precursor according to the shown embodiment. Nanomaterial is supplied in the form of a dispersion in the liquid precursor in the vessel 17 and/or in the form of a dry powder that is mixed with the gaseous precursor in the vessel 19 and/or is injected directly into the flow in the feed line 13, after the valves 15, 20 and 21.

By opening at least one of the first or second valve 20, 21 or by injecting a dry nanomaterial directly into the feed line 13, the flow comprising a carrier gas, a polymerization material and a nanomaterial reaches the top surface 9t of the array of filaments 4 via the outlet port 14. Optionally, the feed line 13 may be split up and also feed a second outlet port 50 which is placed in the plasma chamber 7 below the treated array of filaments 4 and before the electrode 8. By the outlet port 50, the flow reaches the bottom surface 9b of the array of filaments 4.

Hence, the flow arriving at the surface of the array of filaments 4 via the outlet port 14 and/or 50 comprises a carrier gas, a precursor and the nanomaterial. The carrier gas is the main gas that flows from the gas tank 11 and in which the discharge is generated and may comprise any gas or a mixture of gases. The precursor is a polymerization material, which is the building material for the polymer layer and may be supplied directly as a gas, as a liquid (which is gasified) or potentially as a solid (which is turned into gas by sublimation). Optionally, a mixture of several carrier gases and several precursors may be used. The gas(es), precursor(s) and nanomaterial(s) can be delivered in various ways. The following four embodiments are given to illustrate some examples. The embodiments are not exhaustive.

In a first embodiment a carrier gas is delivered from the tank 11. Nanomaterial is mixed with a liquid precursor in the vessel 17, the mixture of the nanomaterial and precursor go through the gasifier 18, valve 20 and is mixed with the carrier gas in the feed line 13.

In a second embodiment a carrier gas is delivered from the tank 11. Nanomaterial is mixed with a gaseous precursor in the vessel 19 and the mixture of the nanomaterial and precursor goes through the valve 21 and is mixed with the carrier gas in the feed line 13.

In a third embodiment a carrier gas from the tank 11 and a gasified liquid precursor from the vessel 17 are delivered into the feed line via the valves 15 and 20, respectively. Nanomaterial is injected directly into the flow in the feed line 13, after the valves 15,20 and 21.

In a fourth embodiment a carrier gas from the tank 11 and a gaseous precursor from the vessel 19 are delivered into the feed line via the valves 15 and 21, respectively. Nanomaterial is injected directly into the flow in the feed line 13, after the valves 15, 20 and 21.

The nano material may comprise metal oxide nanoparticles, such as titanium dioxide ($TiO_2$) to impart UV absorption, an opalescent effect and/or photo catalytic activity for providing e.g. antifouling benefits, a flame retardant surface and/or a support layer in a dye solar cell. Other metal oxide nanoparticles include for example magnesium oxide (MgO) for providing a self-sterilizing function and zinc oxide (ZnO) for providing UV shielding and reducing static electricity. Further, the chemical activity of for example $TiO_2$ and MgO nanoparticles can be used to protect against biological and chemical agents. Instead of metal oxide nano-particles, the method according to the invention is suitable for using any nanomaterial, both organic and inorganic and organic-inorganic, and including not only nanoparticles but, for example, also nanotubes may be deposited in a polymer layer.

It is noted that a combined functionality of polymer layer and of embedded nanomaterial or of several types of nanomaterials may be beneficial for the simultaneous protection against a variety of chemical and biological agents.

Depending on the choice of nanomaterial, a self-decontaminating coatings and/or coatings providing permanent protection may be achieved, e.g. in the case of applying metal oxide nanoparticles.

By the application of another type of nanomaterial, such as functionalized carbon nanotubes, a sensor-like coating may be deposited.

By the employment of the method, the characteristics of the deposited nanomaterial, e.g. its size and size distribution, and its deposit, e.g. surface density, uniformity and homogeneity, may be better controlled. Homogeneous deposition of small-size nanoparticles with narrow size distribution may be beneficial for the efficiency of decontamination.

The method is plasma-based and has advantages following from the dry plasma treatment such as environmental friendliness and no need for drying, as indicated above.

Figure 2:
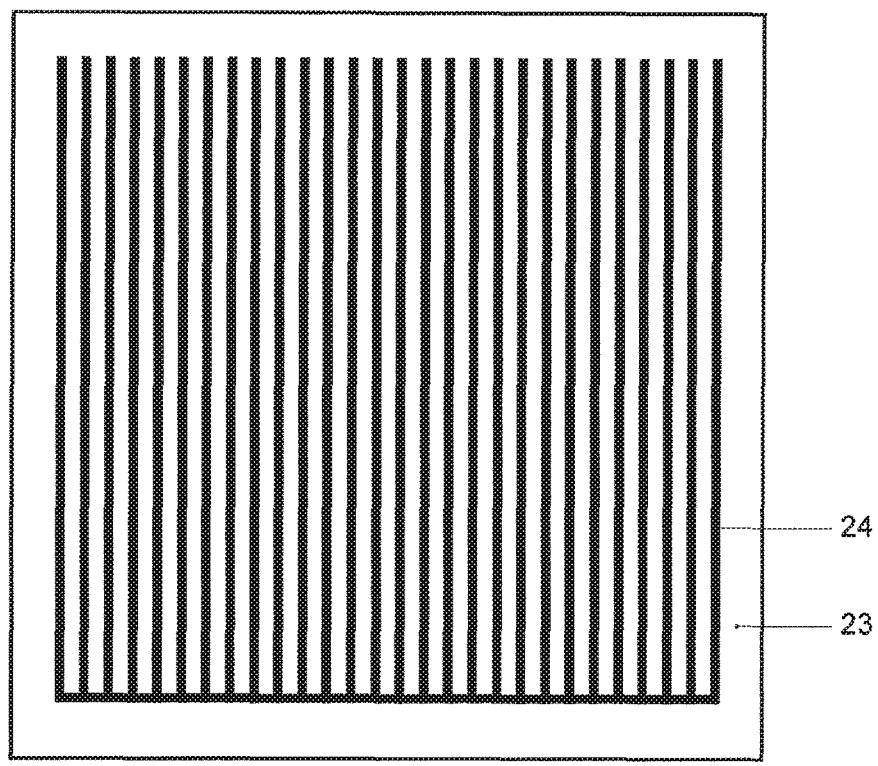
FIG. 2 shows a schematic plan view of a first embodiment of a plasma electrode structure.
Figure 3:
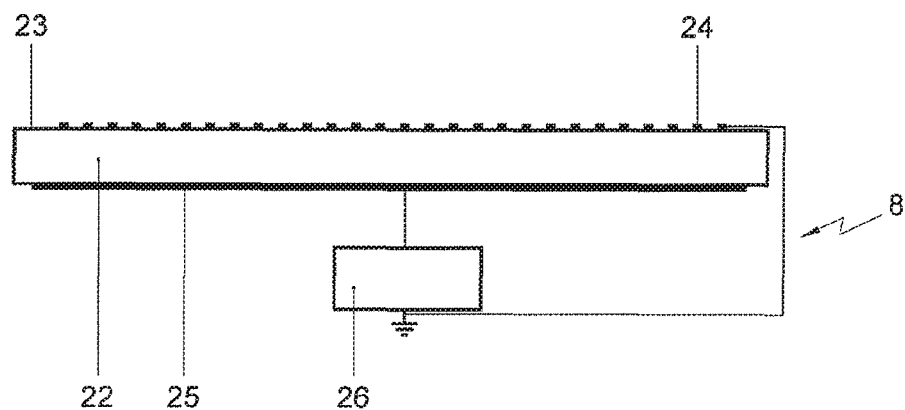
FIG. 3 shows a schematic cross sectional view of the plasma electrode structure of FIG. 2.

FIGS. 2 and 3 show in plan view and in cross sectional view, respectively, an electrode structure 8 according to a first embodiment in more details. The structure 8 comprises a block-shaped dielectric 22 having a substantially flat upper boundary plane 23 facing the bottom surface 9b of the textile in the atmospheric pressure plasma chamber 7. On the upper boundary plane 23 a comb-like electrode structure is arranged, forming a first electrode 24, see in particular FIG. 2. On the opposite side, the lower side of the dielectric 22 a second, substantially rectangular-shaped electrode 25 is arranged. The electrodes 24, 25 are connected with output ports of a power source 26. Application of a voltage between the first and second electrode 24, 25 generates a plasma near the first electrode 24. The electrode structure 8 shown in FIGS. 2 and 3 is known as surface DBD (dielectric barrier discharge).

Figure 4:
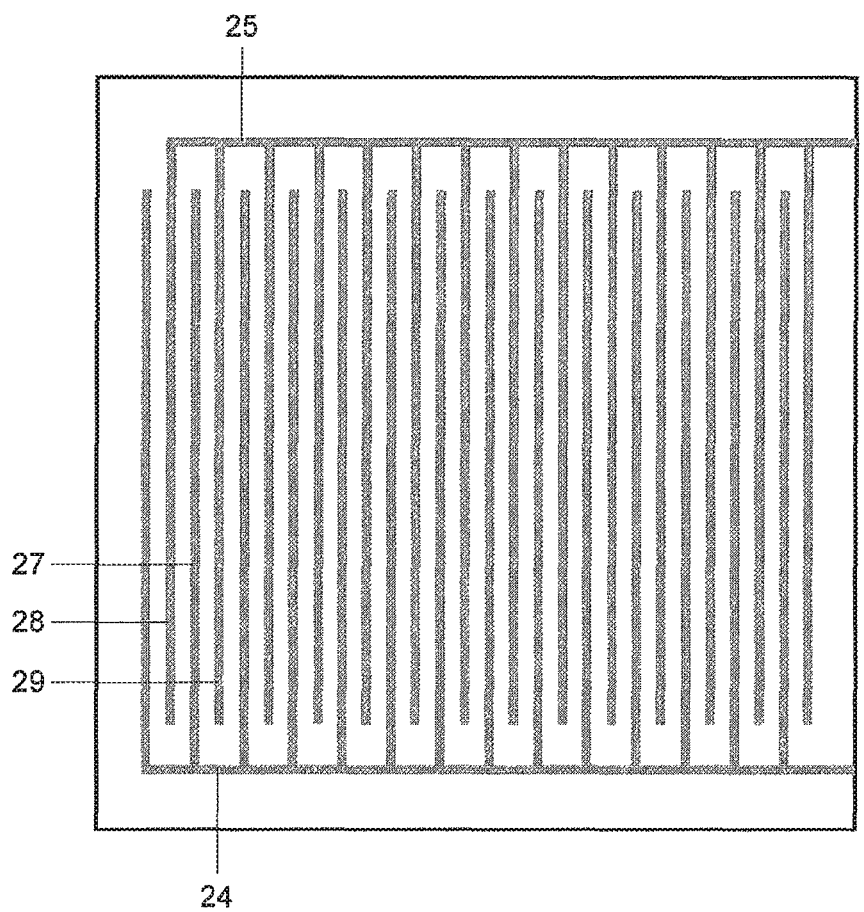
FIG. 4 shows a schematic plan view of a second embodiment of a plasma electrode structure.
Figure 5:
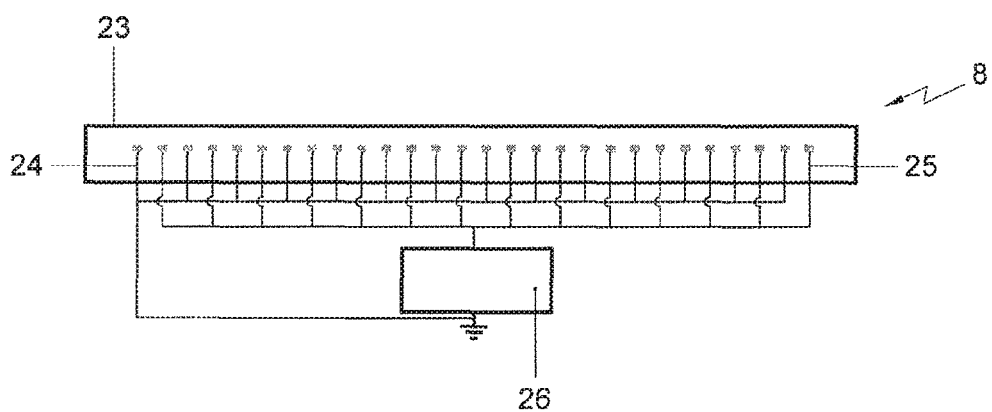
FIG. 5 shows a schematic cross sectional view of the plasma electrode structure of FIG. 4.

FIGS. 4 and 5 show in plan view and in cross sectional view, respectively, a plasma electrode structure 8 according to a second embodiment in more detail. Instead of arranging the first and second electrodes 24, 25 on boundary planes of the dielectric 22, both electrodes 24, 25 are embedded in the dielectric 22, see in particular FIG. 5. Both electrodes have a comb-like structure, wherein at least one extending portion 27 of the first electrode 24 is positioned between two extending portions 28, 29 of the second electrode 25. The second embodiment of the electrode structure 8 is known as coplanar DBD and has a longer lifetime compared with a surface DBD structure since the generated plasma on the substantially flat, upper boundary plane 23 is not in contact with the metallic parts of the electrodes 24, 25.

Figure 6:
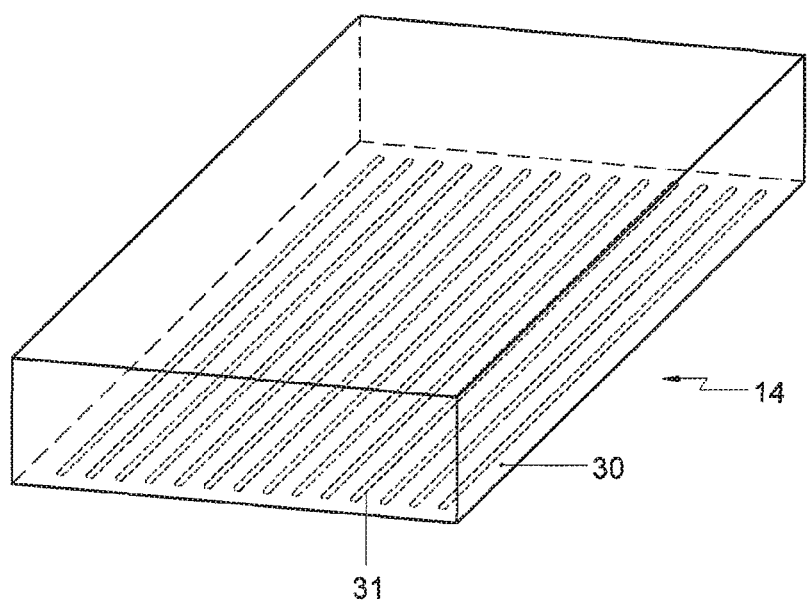
FIG. 6 shows a schematic perspective view of a first embodiment of an outlet port of the apparatus of FIG. 1.
Figure 7:
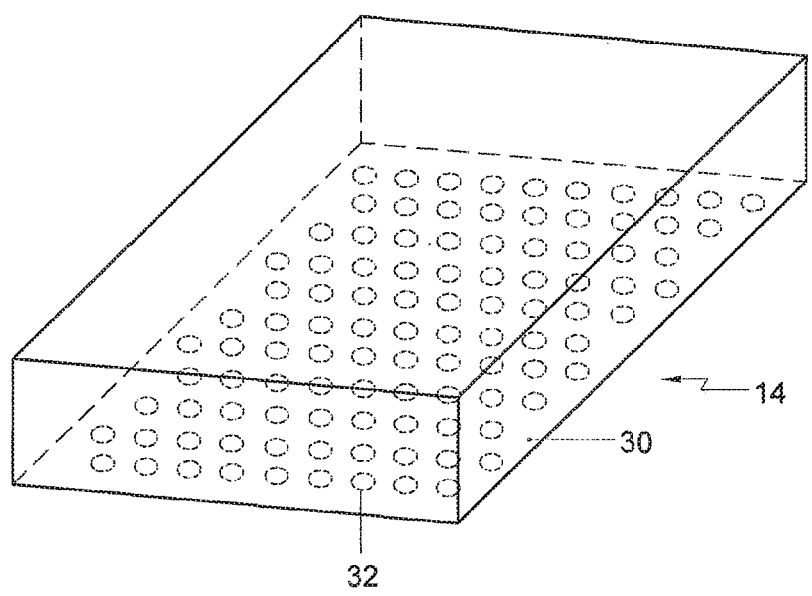
FIG. 7 shows a schematic perspective view of a second embodiment of an outlet port of the apparatus of FIG. 1.

FIGS. 6 and 7 show a schematic perspective view of the outlet ports 14 and 50, respectively. The outlet port 14 comprises a box-shaped structure with an upper opening (not shown) for connection with the feed line 13. The box-shaped structure is provided with openings in the lower plane 30 in order to achieve a substantially homogenous distribution of the mixture of a carrier gas, precursor and the nanomaterial near the top surface 9t of the filament 4 to be treated. The openings are implemented for example as substantially parallel oriented slits 31.

The outlet port 50 also comprises a box-shaped structure, which has a side opening (not shown) for connection with the feed line 13. The box-shaped structure is provided for example with evenly distributed round apertures 32 in order to achieve a substantially homogenous distribution of the mixture of a carrier gas, precursor and the nanomaterial near the bottom surface 9b of the array of filaments 4 to be treated.

Figure 8:
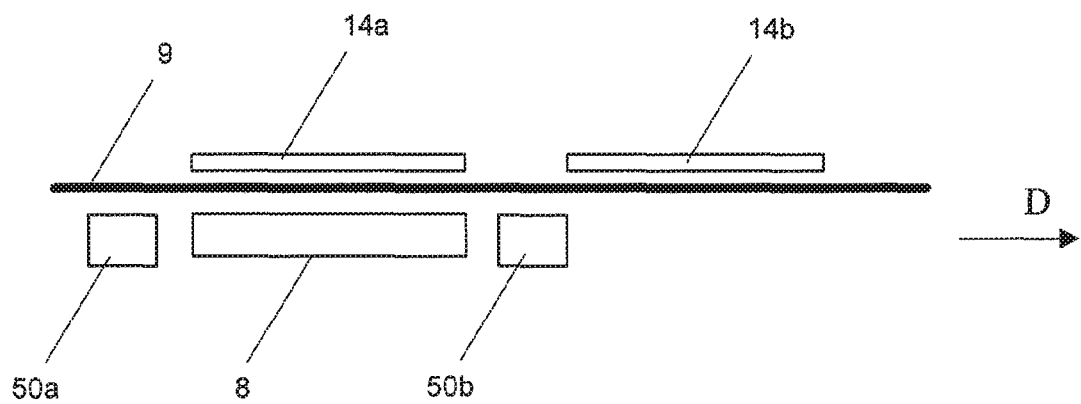
FIG. 8 shows a schematic view of a detail of a second embodiment of a depositing apparatus.
Figure 9:
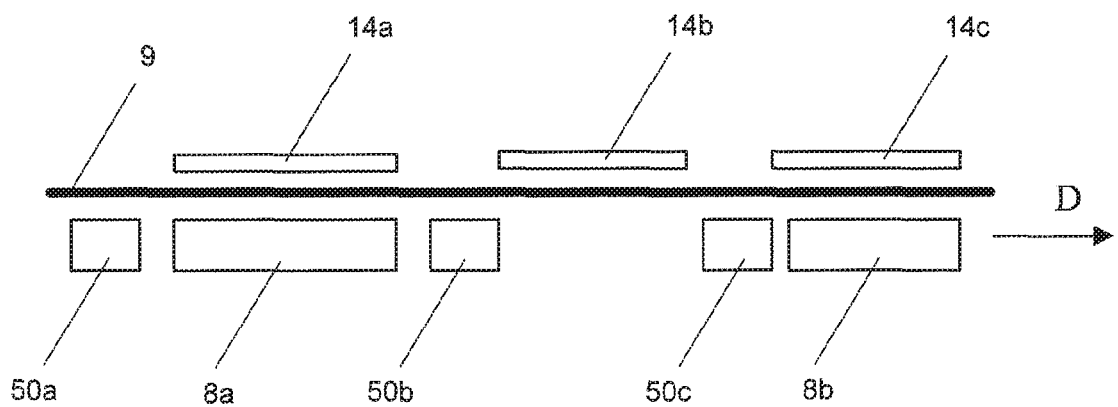
FIG. 9 shows a schematic view of a detail of a third embodiment of a depositing apparatus.

Optionally, another embodiment of the apparatus according to the invention can be arranged in such a way that on one side of the plurality of elongated objects 9 to be treated a system of outlet ports 50 and plasma electrode structures 8 are placed in series, so that the plurality of elongated objects 9 is subsequently treated by a flow and a plasma process, and vice versa. In FIGS. 8 and 9, examples of such configurations are shown. On the other side of the plurality of elongated objects 9 to be treated a series of other outlet ports 14 is arranged for similar treatment of the plurality of elongated objects with a flow. During the process, the plurality of elongated objects 9 moves in a process direction D.

It is noted that the polymerization material and the nanomaterial can be provided near the surface of the material on which the polymer layer containing nanomaterial is to be deposited, either together or separately, both in time and place. The following embodiments are given to illustrate some examples. The embodiments are not exhaustive.

In a first embodiment the polymerization material and the nanomaterial are provided near the surface simultaneously and on the same place via one feed line 13 and outlet port 14 and/or 50, as described above.

In a second embodiment, which may optionally be combined with the first embodiments, the polymerization material and the nanomaterial are provided consecutively in time via one single feed line 13 and outlet port 14 and/or 50. The array of elongated objects material is moved batchwise. The process of providing polymerization material and nanomaterial can be repeated. It is of course also possible to provide the polymerization material via a first outlet port 14a and/or 50a and the nanomaterial via a second outlet port 14b and/or 50b. In the latter case a continuous process can be obtained.

In a third embodiment, which may optionally be combined with previous embodiments, the process is modified to obtain a plasma assisted grafting process. By "plasma assisted grafting" is meant a grafting (creating a polymer layer) process, which does not occur in a plasma but which takes place after a step of activating a treated surface by a plasma. In this process, the surface to be treated is initially processed by a plasma process to form chemically active sites on the surface. During this process, a carrier gas is blown over the surface via a first upper outlet port 14a and/or a first lower outlet port 50a. Then, polymerization material and nanomaterial are deposited simultaneously at the same place (via a second upper outlet port 14b and a second lower outlet port 50b, see FIG. 8) or at distinct places (the polymerization material via a second upper outlet port 14*b* and/or a second lower outlet port 50*b*, and the nanomaterial via a third upper outlet port 14*c*/or and a third lower outlet port 50*c*, see FIG. 9) to form the deposited polymer layer. In the latter case, nanomaterial can also be supplied not only via the third outlet ports 14*c*, 50*c*, but also via the second outlet ports 14*b*, 50*b*. Eventually, the polymerization material may also be delivered together with the nanomaterial via the third outlet ports 14*c*, 50*c*. The steps of supplying the polymerization material and the nanomaterial can be repeated if desired. A carrier gas is provided near a filament at each step involving a plasma treatment.

In the fourth embodiment, which may optionally be combined with previous embodiments, the plasma treatment comprises a so-called plasma induced polymerization technique. This is a two-step process in which polymerization material and nanomaterial are provided on the surface of elongated objects followed by the exposure of the said surface to plasma environment. Polymerization is initiated by plasma species like radicals, metastables and photons.

In this process, polymerization material and nanomaterial are blown onto the surface via a first lower outlet port 50*a* (see FIG. 8). Eventually, polymerization material and nanomaterial are deposited simultaneously at the same place (via a second upper outlet port 14*b* and/or a second lower outlet port 50*b* and/or a third lower outlet port 50*c*, see FIG. 9) or at distinct places (the polymerization material via a second lower outlet port 50*b* and/or a third lower outlet port 50*c*, and the nanomaterial via a second upper outlet port 14*b*, see FIG. 9) after the surface of elongated objects is activated by first plasma stage generated by first electrode structure 8*a* and before the array of elongated objects is guided through second plasma stage generated by second electrode structure 8*b*. Moreover, polymerization material and nanomaterial can be applied on the surface from solution by wet processing techniques like soaking, spraying, dipping, padding, printing, and dip coating before the array of elongated objects is guided through first plasma stage generated by first electrode structure 8*a* (see FIG. 8 or FIG. 9).

The plasma induced polymerization has also been identified as plasma induced grafting.

Figure 10:
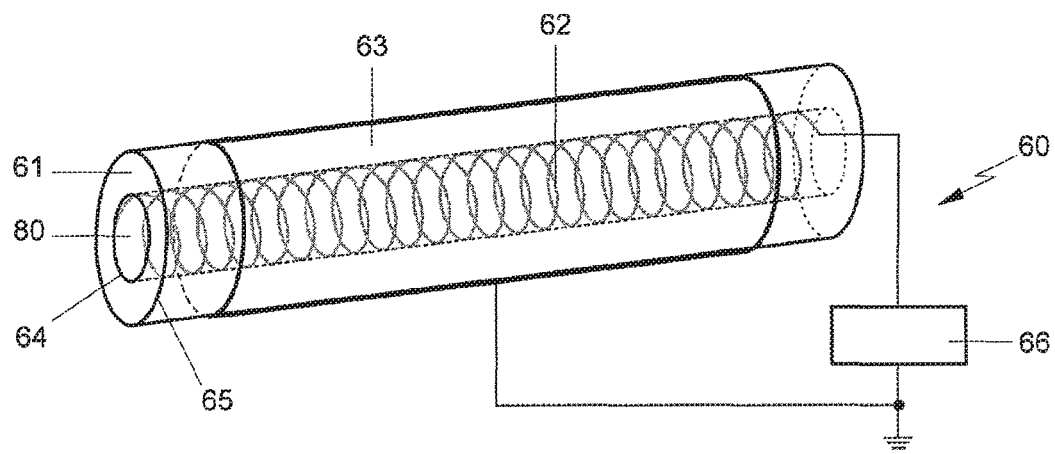
FIG. 10 shows a schematic perspective view of a first embodiment of an apparatus according to the invention.

FIG. 10 shows a schematic perspective view of a first embodiment of an apparatus 60 according to the invention. The apparatus 60 has a guiding structure comprising a curved unitary section that is arranged for at least partially surrounding an elongated object. The guiding structure may further comprise rollers and bobbins for further guiding an elongated object to be treated. The unitary section is cylindrically shaped to enclose the elongated object. Further, the apparatus 60 has an electrode structure that is associated with the unitary section. In particular, the electrode structure defining a process channel 80, comprises a dielectric body provided with a curved section integrated with the curved unitary section. The dielectric body is implemented as a cylinder shell dielectric 61. Further, two electrodes 62, 63 are arranged on an inner and outer surface 64, 65 of the dielectric 61, respectively. As such, one electrode 62 is arranged at the radial inner side of the dielectric body section. The shell dielectric 61 therefore forms part of both the electrode structure and the guiding structure. Thus, the inner surface of the shell dielectric 61 guides an elongated object to be treated by the apparatus. The electrode structure is tubular version of a so-called surface DBD. Due to the hollow structure of the dielectric 61 a filament formed as an elongated object can be fed through the passage 80 that is surrounded by the dielectric 61. The cylinder shell 61 and the outer electrode 63 are tubular having a circular cross section. The inner surface 64 of the dielectric shell 61 defines the process passage 80 for receiving the elongated object to be treated. In particular, the outer electrode 63 connected to a first voltage port of a voltage supplier 66 is a plate 63 attached to the outer side of the dielectric shell 61. The plate 63 serves as an induction electrode and can be manufactured by curing a conductive sheet or mesh. The inner electrode 62 is implemented as a spiral and is connected to a second voltage port of the voltage supplier 66. Further, both electrodes 62, 63 could be implemented as spirals, so that the electrodes have helical forms. Eventually, the inner electrode 62 can be implemented as a comb-like structure collateral to a longitudinal axis of the dielectric shell 61.

Figure 11:
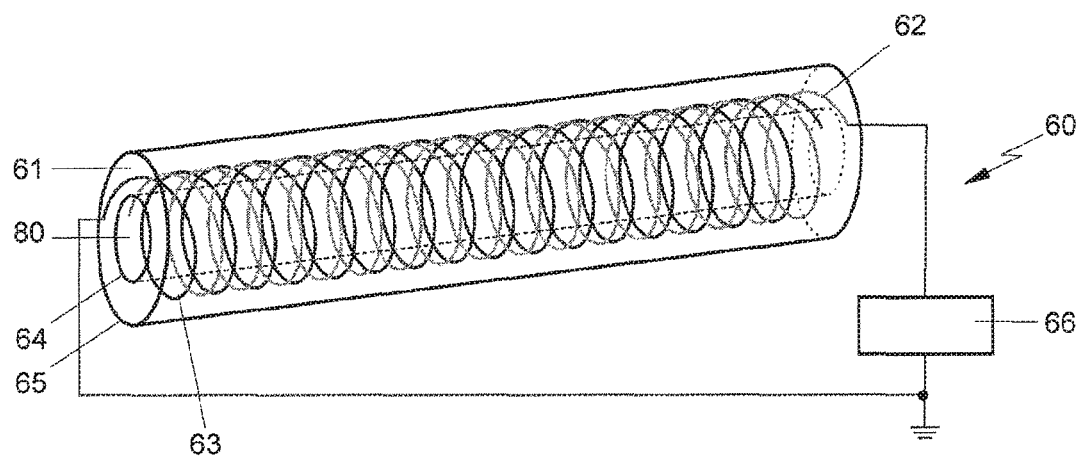
FIG. 11 shows a schematic perspective view of a second embodiment of an apparatus according to the invention.

FIG. 11 shows a schematic perspective view of a second embodiment of an apparatus 60 according to the invention wherein the configuration of electrodes 62, 63, also called a coplanar DBD arrangement, is embedded in the dielectric body implemented as dielectric shell 61 and are formed as spirals. Further, both electrodes 62, 63 could be embedded in the dielectric shell 61 as comb-like structures wherein the comb-like structures are collateral to a longitudinal axis of the dielectric shell 61, wherein at least one extending portion of electrode 62 is positioned between two extending portions of the second electrode 63.

If for a fixed voltage amplitude applied to the electrodes, typically in the order of kV, e.g. ranging from circa 1 kV to circa 10 kV, the diameter of the opening defined by the inner surface 64 of the dielectric is small enough, e.g. in the order of several millimeters or smaller, the activated plasma process is distributed over the entire cross section of the electrode structure. On the other hand, if the diameter of the opening defined above increases, the plasma concentrates near the inner surface 64 of the dielectric shell 61.

During the process according to the invention, an elongated object such as an endless fibre is guided through the channel 80 defined by the inner surface 64 of the dielectric shell 61.

In contrast with disadvantages identified above with respect to the prior art pulsed surface discharge process (aborted arc), the method according to the invention allows a stable operation at atmospheric pressure and homogeneous surface treatment for virtually any gaseous environment. In an embodiment according to the invention, a polymerization material is provided near a surface of the elongated object, a flow is conducted near the surface of the elongated object, the flow comprising a nanomaterial, and a polymer layer containing nanomatarial is deposited on the surface of the elongated object by applying a plasma polymerization process. Thus, the apparatus according to the invention allows the deposition of polymer coatings and nanocomposites, i.e. polymer coatings containing nanoparticles, by plasma polymerization without any limitation on the type and concentration of a precursor and the number of precursors.

Further, the apparatus according the invention allows plasma induced polymerization, plasma activation and plasma assisted grafting.

As the plasma that is applied according to the invention is non-thermal, the treatment is suitable also for heat sensitive materials.

Further, in principle, there is no limitation with respect to elongated object diameter with respect to the apparatus according to the invention.

Figure 12:
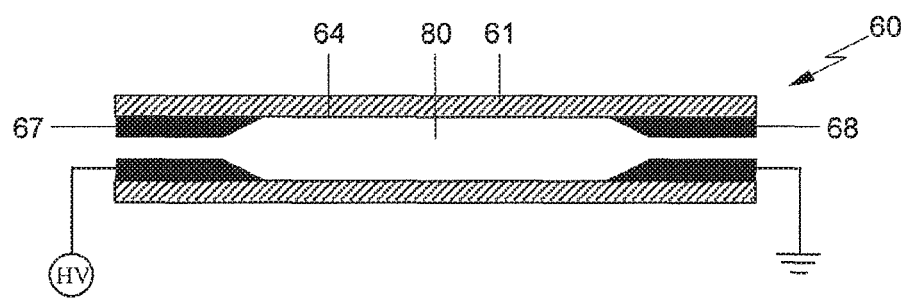
FIG. 12 shows a schematic cross sectional view of a third embodiment of an apparatus according to the invention.

FIG. 12 shows a schematic cross sectional view of a third embodiment of an apparatus 60 according to the invention. The plasma electrode structure comprises a dielectric body provided with a curved section integrated with the curved unitary section. The dielectric body is implemented as a cylinder dielectric shell 61 defining a channel 80 wherein an elongated object to be treated can be fed. Further, two annular shaped electrodes 67, 68 are arranged mutually offset on the inner surface 64 of the dielectric 61. As such, the electrodes are arranged at the radial inner side of the curved dielectric body section. The dielectric shell 61 is made of ceramic. However, also other materials having dielectric properties could be used, such as glass. During operation of the apparatus, a voltage difference is applied between the two electrodes 67, 68.

By applying an electrode structure wherein the electrodes 67, 68 are arranged on the inner surface 64 of the dielectric shell 61, there is always a triple point where the electrode, dielectric and gas meet. Therefore, a lower electric potential difference is sufficient to ignite discharge.

Figure 13:
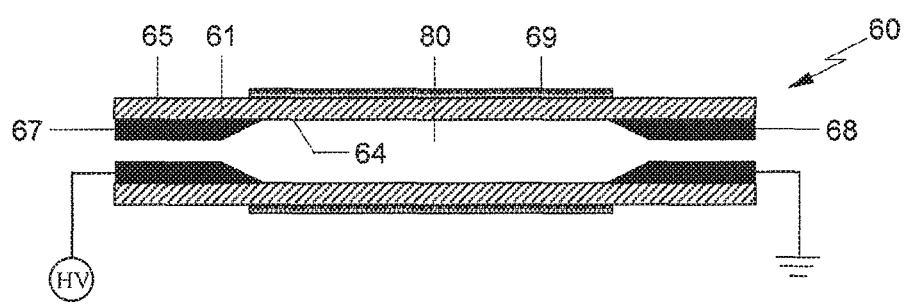
FIG. 13 shows a schematic cross sectional view of a fourth embodiment of an apparatus according to the invention.

FIG. 13 shows a schematic cross sectional view of a fourth embodiment of an apparatus 60 according to the invention wherein a third electrode 69 is arranged for controlling the plasma process and/or reducing an ignition voltage. The third electrode 69 is arranged on the outer surface 65 of the dielectric. In principle, however, the third electrode could also be arranged elsewhere, e.g. in the dielectric material.

Figure 14:
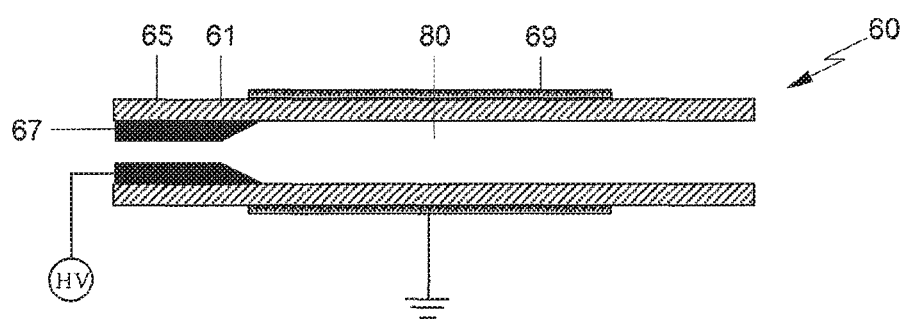
FIG. 14 shows a schematic cross sectional view of a fifth embodiment of an apparatus according to the invention.

Further, in FIG. 14 showing a fifth embodiment of an apparatus 60 according to the invention, being an alternative of the fourth embodiment, one of the two electrodes 67, 68 has been removed, so that the plasma is activated by an electrode 67 inside the dielectric 61 and an electrode 69 outside the dielectric shell 61. Alternatively, instead of applying an electrode outside the dielectric, an electrode embedded in the dielectric 61 can be used.

Figure 15:
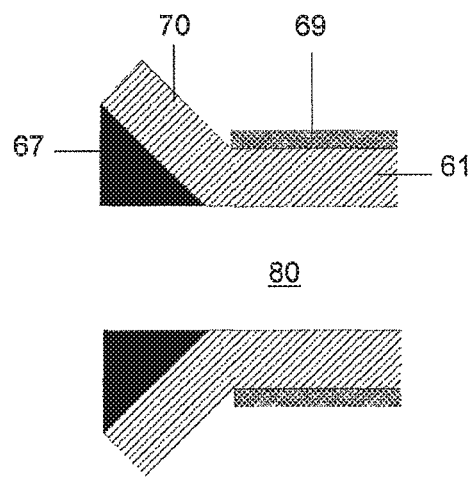
FIG. 15 shows a schematic cross sectional view of a detail of a sixth embodiment of an apparatus according to the invention.

FIG. 15 shows a schematic cross sectional view of a detail of a sixth embodiment of an apparatus 60 according to the invention, wherein the cylinder shell dielectric shell 61 comprises a substantially conical end 70, so that the inner room of the dielectric shell 61 is not reduced by the presence of the electrode 67 that is located near the end of the dielectric shell 61.

Figure 16:
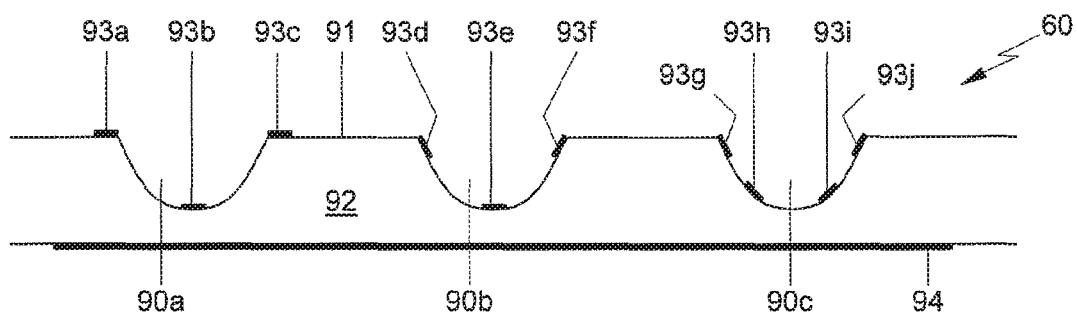
FIG. 16 shows a schematic cross sectional view of a seventh embodiment of an apparatus according to the invention.

FIG. 16 shows a schematic cross section of a seventh embodiment of an apparatus 60 according to the invention. The curved unitary section of the guiding structure is formed as a groove 90a in a substantially flat guiding surface 91 of a dielectric body 92. During operation of the apparatus 60, the groove 90a partially surrounds an elongated object to be treated. On the surface of the groove 90a, at the radial inner sides of the dielectric body, electrodes 93a, 93b, 93c are arranged to generate plasma in cooperation with a ground electrode 94 on the opposite side of the dielectric body 92.

The apparatus shown in FIG. 16 has a multiple number of grooves 90a, 90b, 90c each being provided on its surface with electrodes 93a-93j illustrating different electrode arrangements. Obvious, also other electrode structures can be applied, as the person skilled in the art knows. By providing a multiple number of grooves surrounding partially objects to be treated, the productivity of the apparatus 60 can be enhanced considerably.

In an alternative embodiment, the apparatus comprises a pair of substantially flat structures meeting each other and being provided with at least one pair of opposite arranged grooves forming a passage for receiving the elongated object.

Figure 17:
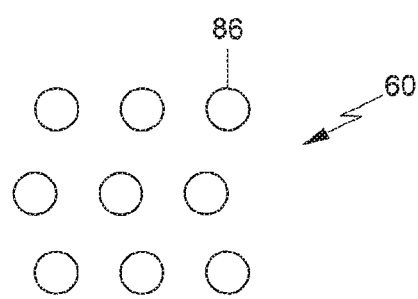
FIG. 17 shows a schematic cross sectional view of a eighth embodiment of an apparatus according to the invention.

It is noted that the idea of multiplication might also be applied to cylindrically shaped structures. Hence, a multiple number of cylindrically shaped guiding structures as e.g. shown in FIGS. 10-15, may be comprised in a single apparatus forming an eighth embodiment of an apparatus according to the invention for enhancing the productivity. Such an apparatus is schematically shown in FIG. 17 wherein an individual cylindrical guiding structure 86 might treat an individual elongated object.

Figure 18:
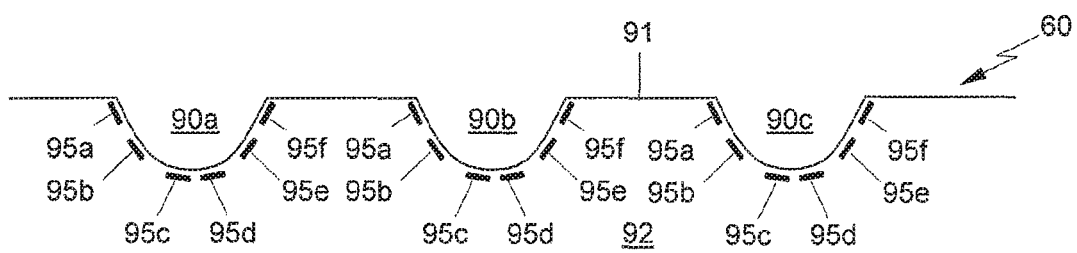
FIG. 18 shows a schematic cross sectional view of a ninth embodiment of an apparatus according to the invention.

FIG. 18 shows an ninth embodiment of an apparatus 60 according to the invention wherein the plasma generating electrodes 95a-f are embedded in the dielectric body, just below the groove surface, thus forming a coplanar variant of the system shown in FIG. 16.

Figure 19:
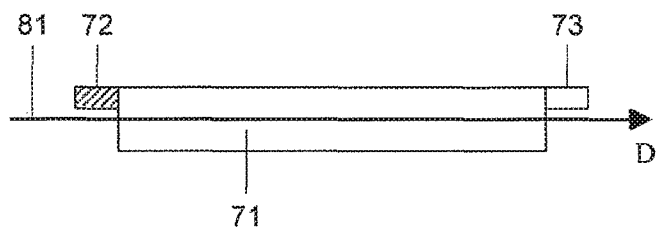
FIG. 19 shows a schematic cross sectional view of a tenth embodiment of an apparatus according to the invention.
Figure 20:
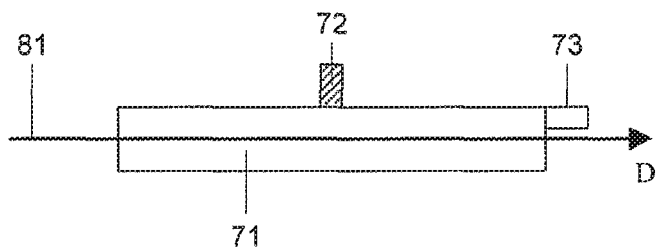
FIG. 20 shows a schematic cross sectional view of a eleventh embodiment of an apparatus according to the invention.

FIG. 19 shows a schematic cross sectional view of a tenth embodiment of an apparatus 60 according to the invention, wherein an endless elongated object 81 is continuously treated by a plasma process in the channel 80 (not shown in FIG. 19) in a process direction D. The reactor 71 comprises one of the cylindrically shaped electrode structures described above so as to optimize a homogenous and efficient plasma process. Further, means for allowing the deposition process to occur are implemented, as described with reference to FIG. 1. In particular, it is mentioned that modules, such as outlet ports can also be formed cylindrically. In FIG. 19, a gas inlet port 72 and a gas outlet port 73 are depicted. FIG. 20, showing an alternative, eleventh embodiment of the apparatus 60 according to the invention has similar inlet and outlet ports 72, 73 located elsewhere on the apparatus 60.

The inlet port 72 to deliver any combination of gas, and/or gaseous and/or gasified liquid precursor, and/or non-polymerizable gasified liquid, and/or nanomaterial (e.g. only one gas such as $N_2$, mixture of several gases such as $N_2+O_2$, mixture of gas and gasified precursor such as $N_2$+HMDSO) can be either on the side of electrode element where the treated endless elongated object enters the reactor, see FIG. 19 and/or in any place along the length of electrode element, see FIG. 20.

Further, the elongated object 81 can be impregnated, for example by a liquid precursor, dispersion of liquid precursor and nanomaterial etc., before entering the plasma reactor 71. In plasma-assisted grafting, the treated elongated object is exposed to precursor after leaving the plasma reactor. For multi-stage treatment, a sequence of electrode elements might be put in series allowing thus for example plasma activation in the first stage, deposition of a coating by plasma polymerization in the second stage, followed by plasma deposition of another, for example protective coating in the last stage. The number of stages and combinations of plasma treatments are not limited. Further, the process is not only suitable for multi-stage processing, but is also relatively easily scalable.

During operation of the plasma apparatus, voltage frequencies can be applied to the electrodes in a range substantially extending from circa 1 kHz to circa 1 MHz. The voltage signals can be applied in a continuous manner or in a pulsed manner.

Figure 21:
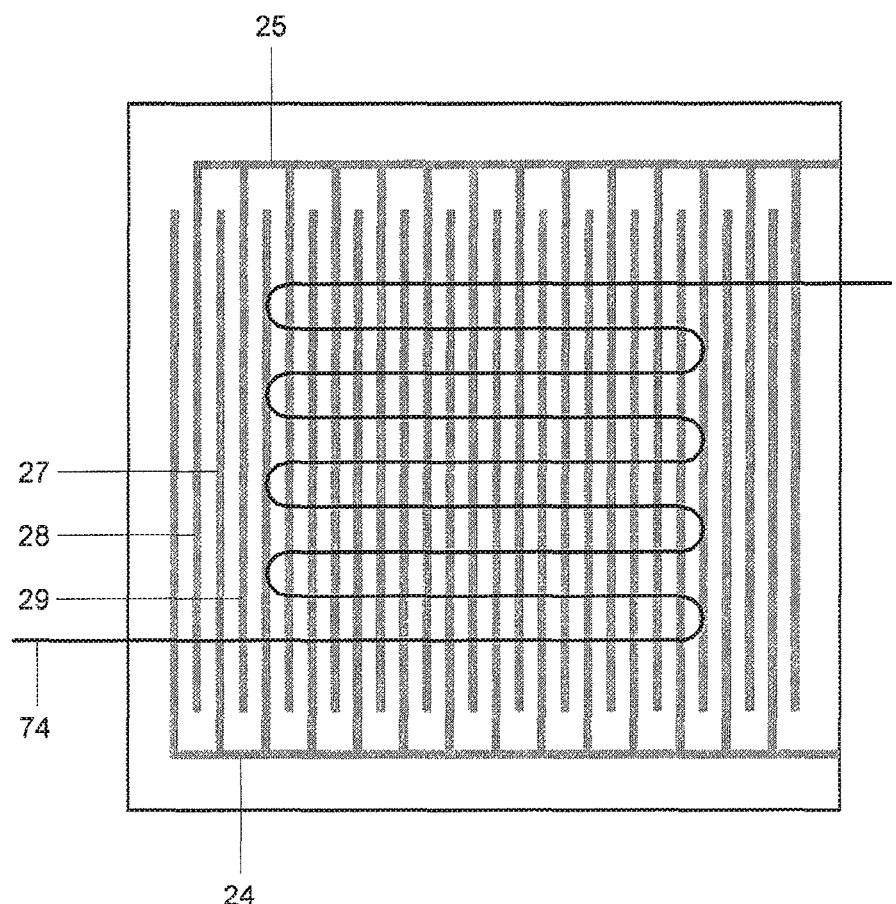
FIG. 21 shows a schematic plan view of an electrode structure.

Further, FIG. 21 shows a schematic plan view of a planar electrode structure according to FIG. 4 wherein the elongated object 74 is arranged in a zigzag configuration. By using the zigzag configuration of the fibre 74, the fibre 74 can efficiently be treated using a planar electrode structure. The line can also be arranged in a straight direction passing the electrode structure without substantial bends. It is noted that a planar electrode structure is not necessarily flat, but can also comprises bended portions. The planar electrode structure extends in a plane. The plane wherein the structure extends may be flat or curved. As an example of a curved planar electrode structure, the plane wherein the structure extends comprises a constant or varying curvature radius. Further, the plane wherein the structure extends may comprises bended portions. Preferably, the line of elongated object 74 is endless, so that a continuous process can be applied. It is noted that the zigzag configuration can also be applied to other planar and coplanar electrode configurations, such as shown in FIG. 4 of this application. Preferably, a guiding system is provided for guiding the elongated object, thereby making the process more robust. Alternatively, the elongated object can be treated using an elongate planar electrode structure, e.g. a rectangular structure, wherein its length is much larger than its width.

As an alternative, an elongated object structure can be treated by the apparatus shown in FIG. 21, wherein the elongated object structure can comprise plurality of individual elongated objects, for example array of filaments, or a substantially uni-directional fabric having a plurality of substantially parallel arranged filaments to be used for example in a reinforced material. In one embodiment, the matrix structure further comprises a number of substantially transversely arranged additional elongated objects thus forming a matrix structure for improving the strength of the structure, e.g. for providing material for tyre production. As an example, the ordered fibre structure system can be embedded in plastic. However, the fibre structure can also be embedded in other materials, such as glass.

Further, also a disordered system of filaments can be treated by the apparatus as shown in FIG. 21, such as felt.

By incorporating a filament into a matrix, reinforced composite materials can be constructed. Further, by using a method for treating an elongated object according to the invention printability and dyeability features of elongated objects can improve.

As indicated, plasma treatment of elongated objects may be performed using surface or coplanar DBD planar structures. These electrode structures are particularly suitable for the treatment of flat materials such as textiles, paper, leather, foils and membranes. According the invention, preferably a simple guiding system can be added for guiding elongated objects in the plasma over the surface of electrode. The thickness of plasma over the flat electrode surface can e.g. be circa 1 mm, depending on e.g. gas environment, while the properties of plasma, such as the density of reactive radicals, depends on the distance form of the electrode surface. The diameter of elongated object that might be homogeneously treated is therefore restricted. To the certain extent, adding additional electrode structure opposite to the first electrode structure helps to improve the homogeneity of treatment of hose shape object. For treating relatively thick elongated object structures, i.e. having relatively large diameter, it is recommended to apply the apparatus having electrode structures with grooves, preferably a coplanar variant shown in FIG. 18, or cylindrically shaped electrodes defining a process channel.

Applications of fibre structures treated by the plasma process include, but are not limited to composite materials, e.g. for the improvement of filament adhesion to a rubber, epoxy or other matrix, the improvement of dying and coating. Examples of concrete applications are belts, such as seat belts or conveyor belts, tubes, hoses, car tyres, fishing lines and rods, racket springs, ropes, filtration fabrics, civil engineering building materials or various fibre reinforced injection molded products for concrete or slates and materials for concrete shield construction. Other possible areas of applications include nets, sails, canvasses, apparel, artificial flowers and lawn, brushes, optical fibres and fibres used to suture wound. Possible applications cover the whole spectrum from low-tech to high-tech volume products to expensive, specialty and high added value products.

As indicated above, the method and apparatus according to the invention can be applied to several types of elongated objects, such as filaments, tubes and rods. Such structures can be manufactured from several materials, such as polymer, wood, ceramic or glass. Preferably, an outer diameter of the elongated object to be treated is smaller than approximately 1 cm. The elongated objects are not necessarily endless.

It is noted that in general, electric pulses or harmonic signals can be applied to the electrodes of the plasma electrode structures described above.

Further, it is noted that the structures described in this application can be used for depositing a polymer layer containing nanomaterial on an elongated object structure by applying a plasma polymerization process, but also for other purposes, such as plasma activation and/or deposition of polymer coatings using a plasma process. Further, nanocomposites, i.e. polymer coatings containing nanomaterial, can also be deposited otherwise, e.g. by plasma-assisted grafting.

As an experiment, spin finish free polyethylene yarn has been treated by plasma activation in $N_2$ plasma using the methods according to the invention employing a planar shaped electrode structure and a cylindrically shaped electrode structure defining a process channel, respectively. In particular, the electrode structure shown in FIG. 10 has been used. Further, the effect of plasma treatment on surface energy has preliminary been studied. The results are summarized in Table 1.

TABLE 1

Surface energy results after plasma treatment

| Polyethylene yarn | treatment time [s] | surface energy [mJ/m$^2$] |
|---|---|---|
| untreated | — | 36-38 |
| planar electrode | 34 | 58 |
| cylindrical electrode | 30 | >104 |

It is noted that the preliminary results suggest a very good surface energy performance using the planar electrode structure. Surprisingly much higher surface energy was achieved even within a shorter treatment time using the cylindrical electrode structure. Using standard measurement techniques, it was not possible to measure the surface energy after the treatment using the cylindrical electrode structure precisely, because the surface tension of test liquids, which were used in the evaluation of surface energy, was not sufficiently high. In the preliminary tests, no process optimization has been performed. No plasma process parameters were changed when interchanging the electrode structure, except for the treatment time.

In an additional experiment, other polyethylene yarn has been treated at similar conditions. Around three times shorter treatment time was sufficient to achieve the same level of surface energy.

In another experiment plasma activation in $N_2$ plasma was performed in order to increase the surface energy of a polyester fibre. Again, the plasma process was not optimized. The surface energy of untreated and washed fibre was circa 46 mJ/m$^2$. After 30 seconds of plasma activation, the surface energy increased to a value in the range of 84-90 mJ/m$^2$, depending on process conditions, again a surprisingly good surface energy performance.

In a further experiment, plasma activation in $CO_2$ plasma and $N_2$ plasma was performed using the planar electrode structure during a period of 10 seconds. The adhesion of the first mentioned polyethylene yarn to polyurethane improved surprisingly extremely highly by approximately 400%. The adhesion test was performed by a pull-out test of a yarn, which was embedded in a 2 mm long matrix made of polyurethane.

In yet another experiment, polyester yarn used in carpets' production has been treated by a cylindrically shaped electrode structure in $N_2+O_2+HMDSO$ atmosphere. Due to the structure of the yarn, water droplet penetrated in to the yarn immediately. Contrary, water droplet could not be absorbed by the yarn after already 10 seconds plasma treatment.

The invention is not restricted to the embodiments described herein.

In the case of surface DBD the electrodes could be covered by a protective layer in order, for example, to minimize sputtering. In the case of coplanar DBD electrodes, metal tracks do not need to be embedded in the dielectric at the same level. Also, an additional ceramic layer can be added to the surface of coplanar DBD electrode element in order to reduce the ignition voltage.

It is noted that dimensions in the shown embodiments, such as thickness of electrodes, thickness of dielectric structures, and distance between electrodes can be chosen such that optimal homogeneity is obtained.

In addition, groove like structures described in relation with FIGS. 16 and 18 can also be combined with the structures shown in FIGS. 10-15.

Further such variants will be obvious for the man skilled in the art and are considered to lie within the scope of the invention as formulated in the following claims.

What is claimed is:

1. An elongated object comprising polyethylene yarn which is free of spin finish which has been treated by a process for generating a plasma comprising the steps of:
   (i) applying potential differences between electrodes of an electrode structure to generate the plasma,
   (ii) at least partially cross-sectionally surrounding the elongated object by a guiding structure which includes a curved unitary section that is cross-sectionally concave, the electrode structure being associated with the curved unitary section, wherein
   the electrode structure comprises a dielectric body provided with a curved section integrated with the curved unitary section, and at least one electrode arranged at the radial inner side of the dielectric body section or embedded in the dielectric body, and wherein
   the elongated objected treated by the plasma exhibits an increased adhesion of the polyethylene yarn to a polymeric bonding matrix as compared to an identical spin finish free polyethylene yarn not treated by the plasma.

2. An elongated object comprising a polyethylene yarn which is free of spin finish, the elongated object having increased surface energy and adhesion bonding to a polymeric bonding matrix by treatment with a plasma generated by a plasma-generating apparatus, the apparatus comprising:
   (i) a guiding structure for guiding the elongated object, and
   (ii) an electrode structure for generating the plasma, wherein
   the guiding structure comprises an elongated object receiving curved unitary section that is cross-sectionally concave and arranged for at least partially cross-sectionally surrounding the elongated object, and wherein
   the electrode structure is associated with the curved unitary section, and wherein
   the electrode structure comprises a dielectric body provided with a curved section integrated with the curved unitary section, and at least one electrode arranged at the radial inner side of the dielectric body section or embedded in the dielectric body, and wherein
   the electrode structure applies a potential difference between the at least one electrode arranged at the radial inner side of the dielectric body section or embedded in the dielectric body and at least one other electrode of the electrode structure to generate the plasma and thereby obtain the elongated object having increased surface energy and adhesion bonding to the polymeric bonding matrix.

3. An elongate object comprising polyethylene yarn which is free of spin finish and which has been treated by a plasma generated between electrodes of a planar electrode structure so as to exhibit an increased surface energy and thereby an increase adhesion of the polyethylene yarn to a polymeric bonding matrix as compared to an identical spin finish free polyethylene yarn not treated by the plasma.

4. The elongate object according to claim 3, wherein the polyethylene yarn comprises a disordered system of polyethylene filaments.

5. The elongate object according to claim 3, wherein the polyethylene yarn is a felt.

6. The elongate object according to claim 3, wherein the polyethylene yarn comprises an ordered system of polyethylene filaments.

7. The elongate object according to claim 3, wherein the polyethylene yarn comprises high tenacity polyethylene filaments.

8. A composite article which comprises a polymeric bonding matrix and the elongate object according to claim 3 embedded in the polymeric bonding matrix.

9. The composite article according to claim 8, wherein the polymeric bonding matrix comprises a polyurethane.

10. The composite article according to claim 8, wherein the polyethylene yarn exhibits a surface energy in a range of 84-90 $mJ/m^2$ after the plasma treatment.

11. An elongate object having increased surface energy and adhesion bonding to a polymeric bonding matrix which is made by a process comprising:
    (i) providing at least one elongated object in the form of a spin finish free polyethylene yarn and a planar electrode structure, and
    (ii) positioning the elongated object near and/or on the electrode structure and applying potential differences between electrodes of the electrode structure to generate a plasma and thereby obtain the elongate object having increased surface energy and adhesion bonding to the polymeric bonding matrix.

12. The elongate object according to claim 11, wherein the elongated object is guided between a pair of planar electrode structures arranged opposite with respect to each other.

13. A product which comprises a plurality of the elongate objects according to claim 11.

14. The product according to claim 13, wherein the elongate objects comprise an ordered system.

15. The product according to claim 14, wherein the ordered system of elongate objects comprises a unidirectional fabric.

16. The product according to claim 13, wherein the elongate objects comprise a disordered system.

17. The product according to claim 16, wherein the disordered system of elongate objects comprises a felt.

* * * * *